United States Patent [19]
Nakamura

[11] Patent Number: 5,349,856
[45] Date of Patent: Sep. 27, 1994

[54] VIBRATORY GYROSCOPE

[75] Inventor: Takeshi Nakamura, Nagaokakyo, Japan

[73] Assignee: Murata Manufacturing Co., Ltd., Kyoto, Japan

[21] Appl. No.: 924,704

[22] Filed: Aug. 4, 1992

[30] Foreign Application Priority Data

Aug. 12, 1991 [JP] Japan ................. 3-228290

[51] Int. Cl.$^5$ .............................. G01P 9/04
[52] U.S. Cl. .......................... 73/505; 73/504
[58] Field of Search ........... 73/505, 504, 510, 512 R, 73/1 DC, 1 DV, 1 D

[56] References Cited

U.S. PATENT DOCUMENTS

| | | | |
|---|---|---|---|
| 5,272,922 | 12/1993 | Watson | 73/505 |
| 5,287,033 | 2/1994 | Morton | 73/505 |
| 5,293,779 | 3/1994 | Nakamura et al. | 73/505 |

OTHER PUBLICATIONS

Nakamura, "Vibration Gyroscope Employs Piezoelectric Vibrator", JEE Journal, pp. 99–104, Sep. 1990.

Primary Examiner—Donald Woodiel
Attorney, Agent, or Firm—Nikaido, Marmelstein, Murray & Oram

[57] ABSTRACT

A vibratory gyroscope comprises, for example, a regular triangular columnar vibrating body, and on two side faces of the vibrating body, two driving and detecting piezoelectric elements are formed. To the piezoelectric elements, an output terminal of an oscillation circuit is connected. Further, the piezoelectric elements are connected respectively to two input terminals of a differential amplifier as a detection circuit which detects outputs thereof. An output terminal of the differential amplifier is connected to one input terminal of a differential amplifying circuit as a composite circuit through a synchronized detection circuit, a smoothing circuit and so on. Furthermore, the output terminal of the differential amplifier is connected to the other input terminal of the composite circuit through an integration circuit, an amplifying circuit and so on.

3 Claims, 2 Drawing Sheets

F I G. 1
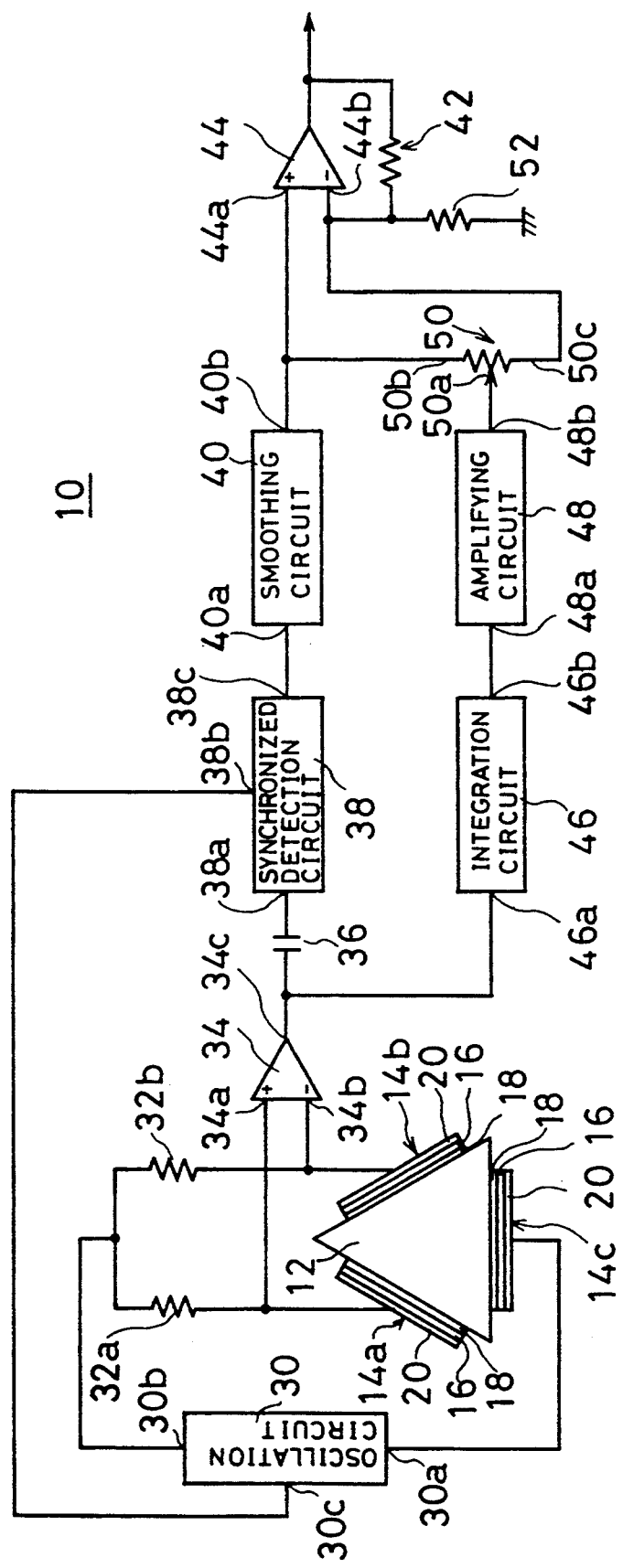

VIBRATORY GYROSCOPE

BACKGROUND OF THE INVENTION

1. Field of the Invention

The present invention relates to a vibratory gyroscope, and particularly, to a vibratory gyroscope comprising a vibrating body and two detecting piezoelectric elements which are formed on the vibrating body for detecting a vibration of the vibrating body, and used, for example, in a navigation system of an automobile or for protecting an unsteady hold on a video-camera and so on.

2. Description of the Prior Art

In this kind of conventional vibrating gyroscope, a vibration is given to a vibrating body. In this state, sine-wave signals having a substantially same strength are output from two detecting piezoelectric elements. When rotating about an axis of the vibrating body, a vibrating direction of the vibrating body is changed by a Coriolis force, the output signal voltage from one detecting piezoelectric element becomes larger and the output signal voltage from the other detecting piezoelectric element becomes smaller responsive to the rotational angular velocity. And hence, by a voltage difference of the output signals from the two detecting piezoelectric elements, the rotational angular velocity is detected.

In such conventional vibratory gyroscope, though the rotational angular velocity can initially be detected accurately, when the vibrating body has warped by temperature change, for example, a signal having a strength responsive to the warp is added to the output signal of one detecting piezoelectric element and deducted from the output signal of the other piezoelectric element, thus it has a possibility that the rotational angular velocity can not be detected accurately. Warped vibrating body is caused by a machining strain of the vibrating body, a difference in coefficients of linear expansion between the vibrating body and the piezoelectric elements formed thereon, and an inaccurate assembling. As such, in the conventional vibratory gyroscope, it was difficult to decide whether the warped vibrating body is caused by the rotational angular velocity or temperature change.

In order to solve such a problem, it may be considered to provide a heater in the vicinity of the vibrating body to keep temperature of the vibrating body at constant, but in this case, power consumption is worsened, the shape is enlarged and much time is required for stabilization.

Though a circuit for compensating characteristics change due to temperature change has been devised, it is not a conclusive solution because of characteristics differences in every piezoelectric element and the characteristics which can be corrected is limited.

SUMMARY OF THE INVENTION

It is therefore a primary object of the present invention to provide a vibratory gyroscope which is capable of detecting a rotational angular velocity accurately even when a vibrating body has warped.

A vibratory gyroscope according to the present invention comprises a vibrating body, an oscillation circuit for vibrating the vibrating body, two detecting piezoelectric elements formed on the vibrating body for detecting vibration of the vibrating body, a detection circuit for detecting an output signal difference of two detecting piezoelectric elements, two input terminals of the detection circuit being connected respectively to two detecting piezoelectric elements, a synchronized detection circuit for detecting an output of the detection circuit in synchronism with vibration of the vibrating body, an input terminal of the synchronized detection circuit being connected to an output terminal of the detection circuit, a smoothing circuit for smoothing an output of the synchronized detection circuit, an input terminal of the smoothing circuit being connected to an output terminal of the synchronized detection circuit, an integration circuit for integrating the output of the detection circuit, an input terminal of the integration circuit being connected to the output terminal of the detection circuit, and a composite circuit for composing an output of the smoothing circuit and an output of the integration circuit, one input terminal of the composite circuit being connected to an output terminal of the smoothing circuit, the other input terminal of the composite circuit being connected to an output terminal of the integration circuit.

The vibrating body is vibrated by the oscillation circuit. In this state, sine-wave signals responsive to the vibration of the vibrating body are output respectively from two detecting piezoelectric elements. The output signals are that, one output signal voltage becomes larger and the other output signal voltage becomes smaller responsive to a rotational angular velocity of the vibrating body. When the vibrating body has warped, an error signal having a strength responsive to the warp is superposed on the output signals of the detecting piezoelectric elements. A difference of the output signals is output from the detection circuit. Thus, the output of the detection circuit includes a Coriolis signal having a strength responsive to the rotational angular velocity of the vibrating body and the error signal having the strength responsive to the warp of the vibrating body.

The output of the detection circuit is detected by the synchronized detection circuit in synchronism with the vibration of the vibrating body, and the detected output is smoothed by the smoothing circuit. Thus, the output of the smoothing circuit includes the error signal having the strength responsive to the warp of the vibrating body, besides the Coriolis signal having the strength responsive to the rotational angular velocity of the vibrating body.

The output of the detection circuit is integrated by the integration circuit. Thus, the Coriolis signal responsive to the rotational angular velocity of the vibrating body and an a.c. portion of the error signal are removed, and the output of the integration circuit is turned into a d.c. signal having the strength responsive to the warp of the vibrating body.

The output of the smoothing circuit and the output of the integration circuit are composed in the composite circuit. In this case, the signal having the strength responsive to the warp of the vibrating body in the output of the smoothing circuit is offset by the output of the integration circuit or the signal having the strength responsive to the warp of the vibrating body. Thus, the output of the composite circuit is turned into the signal having the strength responsive to the rotational angular velocity of the vibrating body.

According to the present invention, a vibratory gyroscope, which is capable of detecting the rotational angular velocity accurately even when the vibrating body has warped, can be obtained.

The above and other objects, features, aspects and advantages of the present invention will become more apparent from the following detailed description of the embodiments with reference to the accompanying drawings.

BRIEF DESCRIPTION OF THE DRAWINGS

FIG. 1 is a block circuit diagram showing an embodiment of the present invention.

DESCRIPTION OF THE PREFERRED EMBODIMENTS

Figure 2:
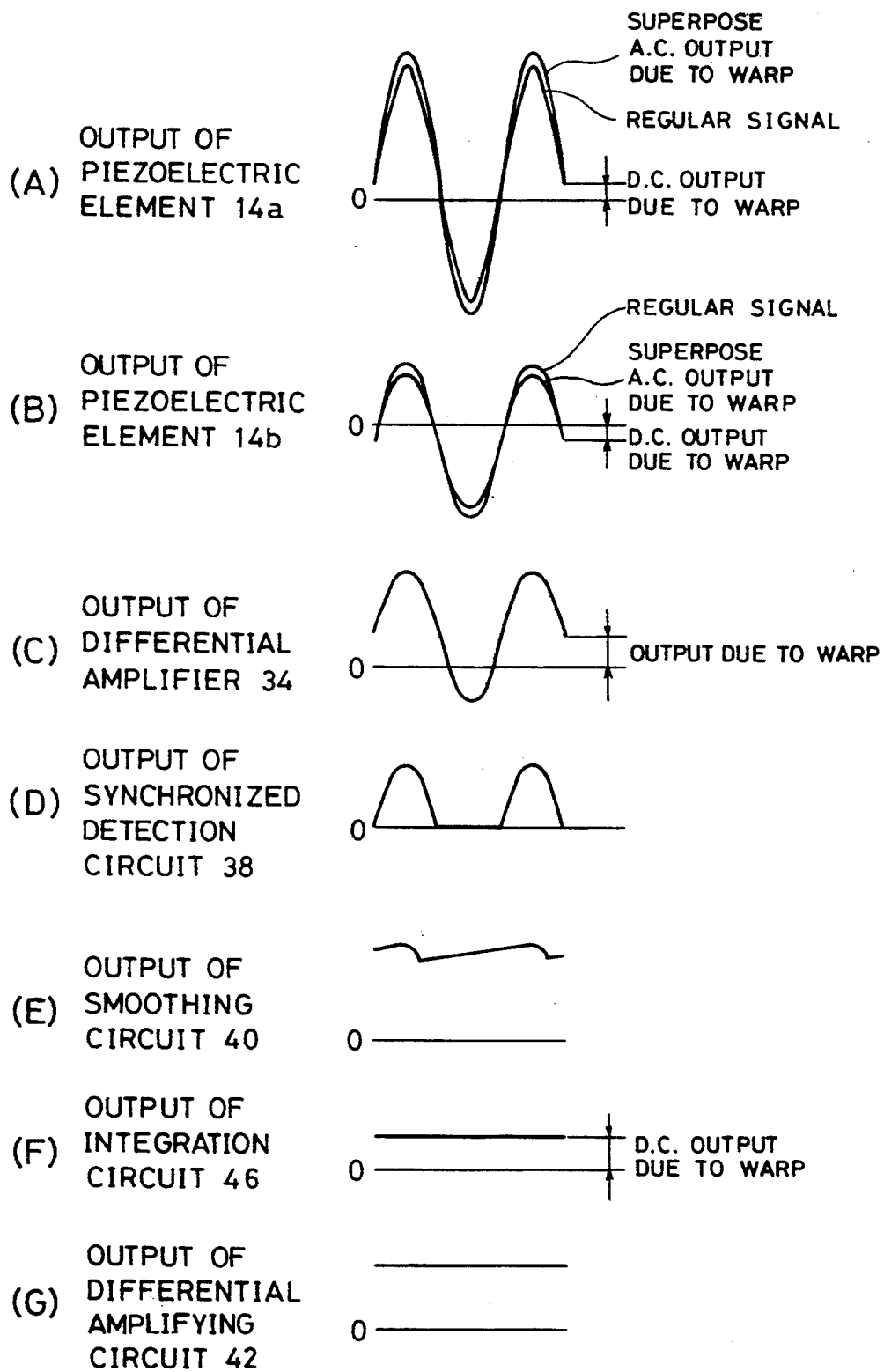
FIG. 2 is a graph showing an example of outputs of respective portions at rotation, when the vibrating body has warped in the vibratory gyroscope shown in FIG. 1, wherein (A) shows the output of one detecting piezoelectric element, (B) shows the output of the other detecting piezoelectric element, (C) shows the output of the differential amplifier, (D) shows the output of the synchronized detection circuit, (E) shows the output of the smoothing circuit, (F) shows the output of the integration circuit, and (G) shows the output of the differential amplifying circuit.

FIG. 1 is a block circuit diagram showing an embodiment of the present invention. The vibratory gyroscope 10 comprises, for example, a regular triangular columnar vibrating body 12. The vibrating body 12 is formed by a material which generally generates a mechanical vibration such as elinver, iron-nickel alloy, quartz, glass, crystal, ceramics and the like.

On the vibrating body 12, piezoelectric elements 14a, 14b and 14c are formed respectively at the centers of its three side faces. The piezoelectric element 14a includes a piezoelectric layer 16 consisting of, for example, ceramics, and on both surfaces of the piezoelectric layer 16, electrodes 18 and 20 are formed respectively. The electrodes 18 and 20 are formed by an electrode material such as gold, silver, aluminum, nickel, copper-nickel alloy (Monel Metal) and the like, and by means of thin-film forming techniques such as sputtering and vacuum evaporation or by means of printing techniques depending on the material. Similarly, the other piezoelectric elements 14b and 14c respectively include the piezoelectric layers 16 consisting of, for example, ceramics, and on both surfaces of the piezoelectric layers 16, the electrodes 18 and 20 are formed respectively. One electrodes 18 of the piezoelectric elements 14a–14c are bonded to the vibrating body 12 by means of, for example, an adhesive.

In this embodiment, for example, two piezoelectric elements 14a and 14b are used for driving and detecting, and the other piezoelectric element 14c is used for feedback.

Between the feedback piezoelectric element 14c and the driving and detecting piezoelectric elements 14a and 14b, an oscillation circuit 30 as a feedback loop for self-excitation drive of the vibrating body 12 is connected. In this case, the feedback piezoelectric element 14c is connected to an input terminal 30a of the oscillation circuit 30, and a first output terminal 30b of the oscillation circuit 30 is connected respectively to the driving and detecting piezoelectric elements 14a and 14b through resistors 32a and 32b.

Furthermore, two piezoelectric elements 14a and 14b are respectively connected to a non-inversion input terminal 34a and an inversion input terminal 34b of a differential amplifier 34 consisting of an operation amplifier as a detection circuit. The differential amplifier 34 is intended to detect an output signal difference of the piezoelectric elements 14a and 14b.

An output terminal 34c of the differential amplifier 34 is connected to a first input terminal 38a of a synchronized detection circuit 38 having a switching device such as a transistor and a thyristor, through a coupling capacitor 36. A second output terminal 30c of the oscillation circuit 30, which outputs a synchronous signal, is connected to a second input terminal 38b of the synchronized detection circuit 38. The synchronized detection circuit 38 is intended to detect an output of the differential amplifier 34 in synchronism with the vibration of the vibrating body 12 by the oscillation circuit 30.

An output terminal 38c of the synchronized detection circuit 38 is connected to an input terminal 40a of a smoothing circuit 40 consisting of an RC filter. The smoothing circuit 40 is intended to smooth an output of the synchronized detection circuit 38.

An output terminal 40b of the smoothing circuit 40 is connected to one input terminal of a differential amplifying circuit 42 as a comosite circuit. In this embodiment, the differential amplifying circuit 42 includes an operation amplifier 44, to a non-inversion input terminal 44a of the operation amplifier 44, the output terminal 40b of the smoothing circuit 40 is connected. The differential amplifying circuit 42 is intended to compose an output of the smoothing circuit 40 and an output of an amplifying circuit 48 to be described later so as to deduct the output of the amplifying circuit 48 from the output of the smoothing circuit 40.

Meanwhile, the output terminal 34c of the aforementioned differential amplifier 34 is connected to an input terminal 46a of an integration circuit 46 consisting of a two-stage RC low-pass filter. The integration circuit 46 is intended to integrate the output of the differential amplifier 34.

An output terminal 46b of the integration circuit 46 is connected to an input terminal 48a of the amplifying circuit 48. The amplifying circuit 48 is intended to amplify an output of the integration circuit 46.

An output terminal 48b of the amplifying circuit 48 is connected to a movable terminal 50a of a variable resistor 50. Two fixed terminals 50b and 50c of the variable resistor 50 are respectively connected to two input terminals of the aforementioned differential amplifying circuit 42, or to the non-inversion input terminal 44a and an inversion input terminal 44b of the operation amplifier 44. One fixed terminal 50c of the variable resistor 50 is grounded through a resistor 52. The variable resistor 50 and the resistor 52 are intended to apply the output of the amplifying circuit 48 to the other input terminal of the differential amplifying circuit 42, or to the inversion input terminal 44b of the operation amplifier 44, in the form of divided pressure having a predetermined strength.

Next, referring to FIG. 2 and so on the operation of the vibratory gyroscope 10 is described. FIG. 2 is a graph showing an example of outputs of respective portions at rotation, when the vibrating body 12 has warped in the vibratory gyroscope 10, wherein (A), (B), (C), (D), (E), (F) and (G) show the respective outputs of one detecting piezoelectric element 14a, the other detecting piezoelectric element 14b, the differential amplifier 34, the synchronized detection circuit 38, the smoothing circuit 40, the integration circuit 46 and the differential amplifying circuit 42.

In the vibratory gyroscope 10, a drive signal is given to the two piezoelectric elements 14a and 14b by the oscillation circuit 30. And hence, the vibrating body 12 is vibrated in a direction orthogonal to the surface of the piezoelectric element 14c. In this state, sine-wave signals having a substantially same strength responsive to the vibration of the vibrating body 12 are output from the two piezoelectric elements 14a and 14b. The output signals are that, the output signal voltage of one detecting piezoelectric element 14a becomes larger and the output signal voltage of the other detecting piezoelectric element 14b becomes smaller, responsive to the rotational angular velocity of the vibrating body 12. When the vibrating body 12 has warped due to temperature change, an error signal having a strength responsive to the warp is superposed on the output signals of the detecting piezoelectric elements 14a and 14b.

The output signal difference of two piezoelectric elements 14a and 14b is output from the differential amplifier 34 as the detection circuit. Thus, the output of the differential amplifier 34 includes a Coriolis signal having the strength responsive to the rotational angular velocity of the vibrating body 12 and the error signal having the strength responsive to the warp of the vibrating body 12.

The output of the differential amplifier 34 is detected by the synchronized detection circuit 38 in synchronism with the vibration of the vibrating body 12, and the detected signal is smoothed by the smoothing circuit 40. Thus, the output of the smoothing circuit 40 includes a signal having the strength responsive to the warp of the vibrating body 12, besides a signal having the strength responsive to the rotational angular velocity of the vibrating body 12. The output of the smoothing circuit 40 is given to one input terminal of the differential amplifying circuit 42.

The output of the differential amplifier 34 is integrated by the integration circuit 46. Thus, the Coriolis signal responsive to the rotational angular velocity of the vibrating body 12 and an a.c. portion of the error signal are removed, and the output of the integration circuit 46 is turned into a d.c. signal having the strength responsive to the warp of the vibrating body 12. The output of the integration circuit 46 is amplified by the amplifying circuit 48, and applied to the other input terminal of the differential amplifying circuit 42 in the form of divided pressure divided by the variable resistor 50 and the like and having a predetermined strength.

In the differential amplifying circuit 42 as the composite circuit, the error signal having the strength responsive to the warp of the vibrating body 12 in the output of the smoothing circuit 40 is corrected. Thus, the output of the differential amplifying circuit 42 is turned into a signal having the strength responsive to the rotational angular velocity of the vibrating body 12. Thus, in the vibratory gyroscope 10, the rotational angular velocity can be detected accurately even when the vibrating body 12 has warped. In the vibratory gyroscope 10, in the same manner as correcting the error due to the warp of the vibrating body 12, an error due to hourly changes of individual characteristics of the detecting piezoelectric elements 14a and 14b can be corrected.

Furthermore, in the vibratory gyroscope 10, the strength of the signal to the other input terminal of the differential amplifying circuit 42 as the composite circuit can be changed by adjusting the variable resistor 50. Thus, the signal responsive to the warp of the vibrating body 12 can be corrected accurately. And hence, the rotational angular velocity can be detected accurately.

In the above-mentioned embodiment, though the regular triangular columnar vibrating body is used, and further, the vibrating body is subjected to the self-excitation drive, in the present invention, the vibrating body may be formed in a shape such as a polygonal column, a cylindrical shape or a plate shape, or the vibrating body may be subjected to the separate excitation drive instead of the self-excitation drive.

It will be apparent from the foregoing that, while the present invention has been described in detail and illustrated, these are only particular illustrations and examples, and the invention is not limited to these. The spirit and scope of the invention is limited only by the appended claims.

What is claimed is:

1. A vibratory gyroscope comprising:
   a vibrating body;
   an oscillation circuit for vibrating said vibrating body;
   two detecting piezoelectric elements formed on said vibrating body for detecting vibration of said vibrating body;
   a detection circuit for detecting an output signal difference of said two detecting piezoelectric elements, two input terminals of said detection circuit being connected respectively to said two detecting piezoelectric elements;
   a synchronized detection circuit for detecting an output of said detection circuit in synchronism with vibration of said vibrating body, an input terminal of said synchronized detection circuit being connected to an output terminal of said detection circuit;
   a smoothing circuit for smoothing an output of said synchronized detection circuit, an input terminal of said smoothing circuit being connected to an output terminal of the synchronized detection circuit;
   an integration circuit for integrating said output of said detection circuit, an input terminal of said integration circuit being connected to said output terminal of said detection circuit; and
   a composite circuit for composing an output of said smoothing circuit and an output of said integration circuit, one input terminal of said composite circuit being connected to an output terminal of the smoothing circuit, the other input terminal of said composite circuit being connected to an output terminal of the integration circuit.

2. A vibratory gyroscope according to claim 1, wherein said output terminal of said integration circuit is connected to said other input terminal of said composite circuit through an amplifying circuit and a variable resistor.

3. A vibratory gyroscope according to claim 2, wherein said integration circuit includes a two-stage low-pass filter.

* * * * *